United States Patent
Katsuyama

(10) Patent No.: US 10,461,365 B2
(45) Date of Patent: Oct. 29, 2019

(54) CONDUCTIVE MATERIAL AND MANUFACTURING METHOD AND PURIFICATION METHOD FOR SAME, AND NON AQUEOUS ELECTROLYTE SOLUTION AND ANTISTATIC AGENT USING SAID CONDUCTIVE MATERIAL

(71) Applicant: NIPPON SHOKUBAI CO., LTD., Osaka (JP)

(72) Inventor: Hiromoto Katsuyama, Osaka (JP)

(73) Assignee: NIPPON SHOKUBAI CO., LTD., Osaka (JP)

(*) Notice: Subject to any disclaimer, the term of this patent is extended or adjusted under 35 U.S.C. 154(b) by 2 days.

(21) Appl. No.: 15/565,759

(22) PCT Filed: Jun. 22, 2016

(86) PCT No.: PCT/JP2016/068460
§ 371 (c)(1),
(2) Date: Oct. 11, 2017

(87) PCT Pub. No.: WO2016/208607
PCT Pub. Date: Dec. 29, 2016

(65) Prior Publication Data
US 2018/0123172 A1    May 3, 2018

(30) Foreign Application Priority Data
Jun. 23, 2015 (JP) ................................. 2015-125926

(51) Int. Cl.
| | |
|---|---|
| H01M 10/0568 | (2010.01) |
| C01B 21/086 | (2006.01) |
| H01G 11/62 | (2013.01) |
| H01B 1/20 | (2006.01) |
| B01D 15/00 | (2006.01) |
| H01M 10/052 | (2010.01) |
| H01M 6/16 | (2006.01) |
| H01G 11/60 | (2013.01) |
| H01M 10/0569 | (2010.01) |

(52) U.S. Cl.
CPC ........ *H01M 10/0568* (2013.01); *B01D 15/00* (2013.01); *C01B 21/086* (2013.01); *H01B 1/20* (2013.01); *H01G 11/62* (2013.01); *H01M 6/166* (2013.01); *H01M 10/052* (2013.01); *H01G 11/60* (2013.01); *H01M 6/164* (2013.01); *H01M 10/0569* (2013.01); *H01M 2300/0028* (2013.01)

(58) Field of Classification Search
CPC ......... H01M 10/0568; H01M 10/0569; H01M 2300/0028; B01D 15/00; C01B 21/086; H01G 11/60; H01G 11/62; H01B 1/20
See application file for complete search history.

(56) References Cited

U.S. PATENT DOCUMENTS

| | | | |
|---|---|---|---|
| 6,387,340 B1 * | 5/2002 | Na ....................... | C01D 15/005 423/301 |
| 2009/0123845 A1 | 5/2009 | Zaghib et al. | |
| 2014/0186722 A1 | 7/2014 | Lim et al. | |
| 2015/0118579 A1 * | 4/2015 | Kondo ................ | H01M 10/052 429/338 |
| 2015/0212918 A1 | 7/2015 | Cai et al. | |
| 2015/0380768 A1 | 12/2015 | Mizuno et al. | |
| 2016/0016797 A1 | 1/2016 | Maekawa et al. | |
| 2017/0214092 A1 | 7/2017 | Okumura et al. | |

FOREIGN PATENT DOCUMENTS

| | | |
|---|---|---|
| CA | 2 619 649 | 3/2007 |
| EP | 2 958 183 | 12/2015 |
| EP | 2 997 349 | 1/2016 |
| JP | 2013101900 | * 5/2013 |
| JP | 2013-251066 | 12/2013 |

(Continued)

OTHER PUBLICATIONS

JP 2013101900 MT (Year: 2013).*
JP 2014070066 MT (Year: 2013).*
International Search Report dated Sep. 27, 2016 in International (PCT) Application No. PCT/JP2016/068460.
Notice of Reasons for Refusal dated Aug. 28, 2018 in corresponding Japanese Application No. 2017-218991, with English Translation.
New version polymer dictionary, Asakura Shoten, 1991, 3rd edition, p. 131, with partial translation.

(Continued)

*Primary Examiner* — Alexander Usyatinsky
(74) *Attorney, Agent, or Firm* — Wenderoth, Lind & Ponack, L.L.P.

(57) ABSTRACT

The objective of the present invention is to provide a clear conductive material with less turbidity, methods for producing and purifying the conductive material, and a nonaqueous electrolyte solution and an antistatic agent which contain the conductive material. The conductive material of the present invention comprises a fluorosulfonylimide salt represented by the following formula (1):

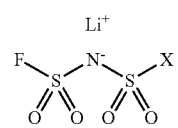

(1)

wherein X is F of a $C_{1-6}$ fluoroalkyl group,
and at least one organic solvent selected from the group consisting of a carbonate solvent, an ester solvent, a ketone solvent and an alcohol solvent, wherein a concentration of the fluorosulfonylimide salt is 0.1 mol/L or more, and a turbidity is 50 NTU/mol-LiFSI or less; and the production method of the present invention comprises the step of filtering a solution comprising the fluorosulfonylimide salt and the organic solvent by using a filter medium comprising the specific material.

16 Claims, No Drawings

(56) References Cited

FOREIGN PATENT DOCUMENTS

| JP | 2014-70066 | | 4/2014 |
|---|---|---|---|
| JP | 2014070066 | * | 4/2014 |
| JP | 2014-201453 | | 10/2014 |
| WO | 2014/048258 | | 4/2014 |
| WO | 2014/126256 | | 8/2014 |
| WO | 2014/148258 | | 9/2014 |
| WO | 2016/052752 | | 4/2016 |

OTHER PUBLICATIONS

Chemistry Dictionary, Tokyo Kagaku Dojin Co., Ltd., 1989, 1st edition, 1st press, p. 232, with partial translation.
Extended European Search Report dated Jan. 30, 2019 in corresponding European Patent Application No. 16814377.4.

* cited by examiner

CONDUCTIVE MATERIAL AND MANUFACTURING METHOD AND PURIFICATION METHOD FOR SAME, AND NON AQUEOUS ELECTROLYTE SOLUTION AND ANTISTATIC AGENT USING SAID CONDUCTIVE MATERIAL

TECHNICAL FIELD

The present invention relates to a conductive material. More specifically, the present invention relates to a conductive material containing a fluorosulfonylimide salt, and a method for producing and a method for purifying the conductive material, and a nonaqueous electrolyte solution and an antistatic agent containing the conductive material.

BACKGROUND ART

A fluorosulfonylimide salt and a derivative thereof are useful for various use applications such as an electrolyte of various power storage devices, an additive, a selective electrophilic fluorinating agent, a photo-acid-generating agent, a heat-acid-generating agent and a near-infrared light-absorbing pigment.

Patent Document 1 discloses a method for producing a highly pure disulfonylamine alkali metal salt by subjecting a disulfonylamine onium salt to a cation exchange reaction in an organic solvent, filtering the thus obtained organic solvent solution of an alkali metal salt with a filter having a retained particle diameter of 0.1 to 10 µm, concentrating the filtrate, and crystalizing the disulfonylamine alkali metal salt.

PRIOR ART DOCUMENT

Patent Document

Patent Document 1: WO 2014/148258

DISCLOSURE OF THE INVENTION

Problems to be Solved by the Invention

The inventor of the present invention found that, as a result of various researches, a solution of a fluorosulfonylimide salt becomes turbid in some cases and a turbidness degree becomes higher with increasing the concentration of the fluorosulfonylimide salt as a problem. For example, when such a solution is used as a nonaqueous electrolyte solution of a lithium ion secondary battery, the turbidness may become a cause of clogging of a separator. In addition, when the solution is used as an antistatic, agent, the turbidity may change the color tone and outside appearance of a molded product containing the antistatic agent.

In general, an electrolyte solution is filtered using a stainless steel mesh or a mesh made of polyolefin such as polyethylene and polypropylene to be used for various use applications. For example, such a filtered electrolyte solution is used in a power storage device such as a lithium ion secondary battery or for preventing static charge. It is however difficult to remove the turbidness of a fluorosulfonylimide salt solution by the filtration using the above-described mesh.

Under the above-described circumstances, the objective of the present invention is to provide a clear conductive material with less turbidity and methods for producing and purifying the conductive material. In addition, the objective of the present invention is to provide a nonaqueous electrolyte solution and an antistatic agent which contain the conductive material.

Means for Solving the Problems

The conductive material of the present invention which can reach the above-described objective is characterized in comprising a fluorosulfonylimide salt represented by the following formula (1) and at least one organic solvent selected from the group consisting of a carbonate solvent, an ester solvent, a ketone solvent and an alcohol solvent, wherein a concentration of the fluorosulfonylimide salt is 0.1 mol/L or more, and a turbidity measured by a light scattering measurement method using a Formazine standard solution at 25° C. is 50 NTU/mol-LiFSI or less.

(1)

wherein X is F or a $C_{1-6}$ fluoroalkyl group.

It is preferred that the organic solvent comprises the carbonate solvent. In addition, it is preferred that the conductive material comprises at least one compound selected from the group consisting of a compound represented by the following formula (2), a compound represented by the following formula (3) and lithium hexafluorophosphate.

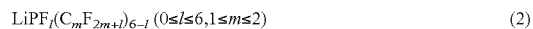

$$LiPF_l(C_mF_{2m+1})_{6-l} \ (0 \leq l \leq 6, 1 \leq m \leq 2) \quad (2)$$

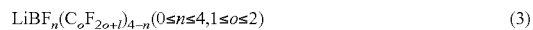

$$LiBF_n(C_oF_{2o+1})_{4-n} (0 \leq n \leq 4, 1 \leq o \leq 2) \quad (3)$$

A nonaqueous electrolyte solution comprising the conductive material and an antistatic agent comprising the conductive material are preferred embodiments of the present invention.

The above-described method for producing and method for purifying the conductive material are included in the present invention. The production method and purification method of the present invention are characterized in that the conductive material comprises the fluorosulfonylimide salt represented by the above-described formula (1) and at least one organic solvent selected from the group consisting of a carbonate solvent, an ester solvent, a ketone solvent and an alcohol solvent, and comprising the step of filtering a solution comprising the fluorosulfonylimide salt by using a filter medium comprising at least one material selected from the group consisting of a cellulose resin, a polyester resin, a silicon dioxide material and activated carbon.

Effect of the Invention

According to the production method and purification method of the present invention, a clear conductive material with less turbidity can be provided. In addition, the turbidity of the conductive material of the present invention is 50 NTU/mol-LiFSI or less. As a result, when the conductive material of the present invention is contained in a nonaqueous electrolyte solution of various power storage devices, faults may hardly occur. In addition, the antistatic agent containing the conductive material of the present invention may not cause the defect of the outside appearance of a molded product.

MODE FOR CARRYING OUT THE INVENTION

1. Conductive Material

The conductive material of the present invention is characterized in comprising a fluorosulfonylimide salt represented by the following formula (1) and at least one organic solvent selected from the group consisting of a carbonate solvent, an ester solvent, a ketone solvent and an alcohol solvent, wherein a concentration of the fluorosulfonylimide salt is 0.1 mol/L or more, and a turbidity is 50 NTU/mol-LiFSI or less. The above fluorosulfonylimide salt is referred to as "fluorosulfonylimide salt (1)" in some cases.

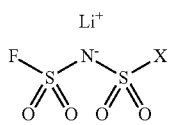
(1)

wherein X is F of a $C_{1-6}$ fluoroalkyl group.

When the fluorosulfonylimide salt (1) is dissolved in an organic solvent, turbidness may be caused in the obtained solution in some cases. When such a solution is used as a nonaqueous electrolyte solution of a lithium ion secondary battery, the turbidness may become a cause of clogging of a separator. In addition, when the solution is used as an antistatic agent, the turbidness may change the color tone and outside appearance of a molded product containing the antistatic agent. The inventor focused attention on the above problems and further considered the problems, and completed the present invention by finding that when the concentration of the fluorosulfonylimide salt (1) in the solution of the fluorosulfonylimide salt is 0.1 mol/L or more and the turbidity of the solution is 50 NTU/mol-LiFSI or less, the problems can be suppressed.

1-1. Fluorosulfonylimide Salt

The conductive material of the present invention comprises the fluorosulfonylimide salt represented by the following general formula (1).

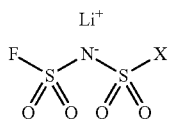
(1)

In the general formula (1), 'X' is a fluorine atom (F) or a $C_{1-6}$ fluoroalkyl group. In the term "fluorosulfonylimide" of present invention, not only bis(fluorosulfonyl)imide having two fluorosulfonyl groups but also N-(fluorosulfonyl)-N-(fluoroalkylsulfonyl)imide having a fluorosulfonyl group and a fluoroalkylsulfonyl group are included.

A $C_{1-6}$ fluoroalkyl group means a $C_{1-6}$ alkyl group of which a part or all of hydrogen atoms are substituted by fluorine atoms. The fluoroalkyl group may have a straight-chain, a branched-chain, a ring or the combination structure thereof. A linear or branched fluoroalkyl group are preferred, and a linear fluoroalkyl group is more preferred. The specific fluoroalkyl group is exemplified by fluoromethyl, difluoromethyl, trifluoromethyl, fluoroethyl, difluoroethyl, trifluoroethyl, pentafluoroethyl, fluoropropyl, trifluoropropyl, heptafluoropropyl, fluorobutyl, fluoropentyl and fluorohexyl. Among the examples, a fluorine atom and $C_{1-3}$ fluoroalkyl group are preferred as 'X'.

The specific fluorosulfonylimide salt (1) is exemplified by lithium bis(fluorosulfonyl)imide, lithium (fluorosulfonyl)(trifluoromethylsulfonyl)imide, lithium (fluorosulfonyl)(pentafluoroethylsulfonyl)imide and lithium (fluorosulfonyl)(heptafluoropropylsulfonyl)imide, preferably lithium bis(fluorosulfonyl)imide, lithium (fluorosulfonyl)(trifluoromethylsulfonyl)imide, lithium (fluorosulfonyl)(pentafluoroethylsulfonyl)imide, lithium (fluorosulfonyl)(heptafluoropropylsulfonyl)imide, and more preferably lithium bis(fluorosulfonyl)imide and lithium (fluorosulfonyl)(trifluoromethylsulfonyl)imide.

The conductive material of the present invention may contain one kind of fluorosulfonylimide salt (1) alone or two or more kinds of fluorosulfonylimide salt (1). A commercially available fluorosulfonylimide salt (1) may be used, or a fluorosulfonylimide salt (1) which is synthesized by a conventionally-known method may be used.

The concentration of the fluorosulfonylimide salt (1) in the conductive material is 0.1 mol/L or more, preferably 0.2 mol/L or more, more preferably 0.5 mol/L or more, even more preferably 1 mol/L or more, even more preferably 1.3 mol/L or more, particularly preferably 1.6 mol/L or more, and most preferably 2 mol/L or more. The concentration is preferably 6 mol/L or less, more preferably 5 mol/L or less, and even more preferably 4.5 mol/L or less. When the concentration of the fluorosulfonylimide salt (1) is less than 0.1 mol/L, a turbidity is hardly remarkably increased. In addition, it may become difficult in some cases to use a solution having an excessively low concentration of the fluorosulfonylimide salt (1) as a conductive material. On the one hand, when the concentration of the fluorosulfonylimide salt (1) is too high, a part of the fluorosulfonylimide salt (1) may not be dissolved or the fluorosulfonylimide salt (1) may be precipitated during the preparation of the conductive material.

The conductive material of the present invention may contain other electrolyte salt except for the fluorosulfonylimide salt (1). As the other electrolyte salt, a conventionally-known electrolyte salt such as an inorganic cation salt and an organic cation salt which contain an anion such as a trifluoromethanesulfonate ion ($CF_3SO_3^-$), a fluorophosphate ion ($PF_6^-$), a perchlorate ion ($ClO_4^-$), a tetrafluoroborate ion ($BF_4^-$), a hexafluoroarsenate ion ($AsF_6^-$), a tetracyanoborate ion ($[B(CN)_4]^-$), a tetrachloroaluminium ion ($AlCl_4^-$), a tricyanomethide ion ($C[(CN)_3]^-$), a dicyanamide ion ($N[(CN)_2]^-$), a tris(trifluoromethanesulfonyl)methide ion ($C[(CF_3SO_2)_3]^-$), a hexafluoroantimonate ion ($SbF_6^-$) and a dicyanotriazolate ion (DCTA) may be used.

As an inorganic cation, an alkali metal cation and an alkaline-earth metal cation are preferred; and as an organic, cation, an onium cation is preferred.

In the present invention, among conventionally-known electrolyte salts, one or more kinds of compounds selected from the group consisting of a compound represented by a general formula (2): $LiPF_l(C_mF_{2m+1})_{6-l}$ ($0 \le l \le 6$, $1 \le m \le 2$), a compound represented by a general formula (3): $LiBF_n(C_oF_{2o+1})_{4-n}$ ($0 \le n \le 4$, $1 \le o \le 2$) and lithium hexafluoroarsenate ($LiAsF_6$) are preferably used. Hereinafter, the above compounds are referred to as "other electrolyte salt" in some cases.

The electrolyte salt represented by the general formula (2) is preferably exemplified by $LiPF_6$, $LiPF_3(CF_3)_3$, $LiPF_3(C_2F_5)_3$, $LiPF_3(C_3F_7)_3$ and $LiPF_3(C_4F_9)_3$, and more preferably $LiPF_6$ and $LiPF_3(C_2F_5)_3$, and even more preferably $LiPF_6$. The salt is hereinafter referred to as "electrolyte salt (2)" in some cases.

The electrolyte salt represented by the general formula (3) is preferably exemplified by $LiBF_4$, $LiBF(CF_3)_3$, $LiBF(C_2F_5)_3$ and $LiBF(C_3F_7)_3$, and more preferably $LiBF_4$ and $LiBF(CF_3)_3$, and even more preferably $LiBF_4$. The salt is hereinafter referred to as "electrolyte salt (3)" in some cases.

Only one kind of the above other electrolyte salt may be used alone, or two or more kinds of the salts may be used in combination. Among the other electrolyte salts, $LiPF_6$, $LiPF_3(C_2F_5)_3$, $LiBF_4$ and $LiBF(CF_3)_3$ are preferred, $LiPF_6$ and $LiPF_3(C_2F_5)_3$ are more preferred, and $LiPF_6$ is even more preferred.

The concentration of the other electrolyte salt in the conductive material is preferably 0.1 mol/L or more, more preferably 0.2 mol/L or more, even more preferably 0.5 mol/L or more, and preferably 2.0 mol/L or less, more preferably 1.8 mol/L or less, even more preferably 1.5 mol/L or less. When the concentration of the other electrolyte salt in the conductive material is excessively high, the viscosity of the conductive material may be increased and as a result, an ion conductivity may be decreased. On the one hand, when the concentration of the other electrolyte salt is excessively low, a desired ion conductivity may not be obtained.

It is preferred that the conductive material of the present invention contains 5 mol % or more of the fluorosulfonylimide salt (1) to 100 mol % as a total amount of the fluorosulfonylimide salt (1) and the other electrolyte salt. The ratio is more preferably 10 mol % or more, even more preferably 20 mol % or more, and preferably 90 mol % or less, more preferably 80 mol % or less, even more preferably 70 mol % or less. When the amount of the fluorosulfonylimide salt (1) contained in the conductive material is too high or too low, it may become difficult to obtain a desired property.

In addition, it is preferred that the total concentration of all electrolyte salts of the fluorosulfonylimide salt (1) and other electrolyte salt in the conductive material of the present invention is 0.1 mol/L or more and 6 mol/L or less. The total concentration is more preferably 0.2 mol/L or more, even more preferably 0.5 mol/L or more, and more preferably 5 mol/L or less, even tore preferably 4.5 mol/L or less, even more preferably 4.0 mol/L or less.

1-2. Organic Solvent

The conductive material of the present invention contains at least one organic solvent selected from the group consisting of a carbonate solvent, an ester solvent, a ketone solvent and an alcohol solvent.

The carbonate organic solvent is exemplified by a chain carbonate ester solvent such as dimethyl carbonate, ethyl methyl carbonate, diethyl carbonate, diphenyl carbonate and methyl phenyl carbonate; and a cyclic carbonate ester solvent such as ethylene carbonate, propylene carbonate, 2,3-dimethylethylene carbonate, butylene carbonate, vinylene carbonate and 2-vinylethylene carbonate.

The ester organic solvent is exemplified by an aromatic carboxylate ester solvent such as methyl benzoate and ethyl benzoate; a lactone solvent such as γ-butyrolactone, γ-valerolactone and δ-valerolactone; and a phosphate ester such as trimethyl phosphate, ethyl dimethyl phosphate, diethyl methyl phosphate and triethyl phosphate.

The ketone organic solvent is exemplified by acetone, methyl ethyl ketone, methyl isobutyl ketone, diisobutylketone and cyclohexanone.

The alcohol organic solvent is exemplified by ethylene glycol, propylene glycol, ethylene glycol monomethyl ether, ethylene glycol monoethyl ether, methanol, ethanol, propane-1-ol, propane-2-ol and butane-2-ol.

It is preferred that the conductive material of the present invention contains a carbonate organic solvent among the above-described organic solvents. Among the carbonate organic solvent, dimethyl carbonate, ethyl methyl carbonate, diethyl carbonate, propylene carbonate and ethylene carbonate are more preferred. Among the examples, dimethyl carbonate, ethyl methyl carbonate and diethyl carbonate are preferred, since the solvent is excellent at a dissolving ability due to low viscosity.

When two or more kinds of organic solvents are mixed to be used, the combination thereof is not particularly restricted and various combinations can be employed. For example, two or more kinds of carbonate organic solvents may be used, two kinds of organic solvents other than a carbonate organic solvent may be combined, and a carbonate solvent and other organic solvent may be combined to be used. When two or more kinds of organic solvents are mixed, it is preferred that the thus obtained mixed solvent contains a carbonate organic solvent. As a preferred combination, a combination of a chain carbonate ester solvent and a cyclic carbonate ester is exemplified. A combination of a chain carbonate ester solvent and ethylene carbonate is more preferred. In particular, a combination of ethylene carbonate and dimethyl carbonate, ethyl methyl carbonate or diethyl carbonate is preferred in terms of high versatility.

When a carbonate organic solvent and other organic solvent are mixed to be used, a mixing ratio of a carbonate organic solvent:other organic solvent by volume is preferably 5:95 to 95:5, more preferably 10:90 to 90:10, and even more preferably 20:80 to 80:20.

It is preferred that an organic solvent is contained in the conductive material of the present invention at a rate of 20 mass % or more and 99 mass % or less to 100 mass % of the conductive material. When a content of an organic solvent is excessively large, a desired property may not be possibly obtained; on the one hand, when a content of an organic solvent is excessively small, a solute may be possibly precipitated. The rate is more preferably 30 mass % or more, even more preferably 40 mass % or more, even more preferably 50 mass % or more, and more preferably 90 mass % or less, ever more preferably 80 mass % or less, particularly preferably 70 mass % or less, most preferably 60 mass % or less.

1-3. Additive

The conductive material of the present invention may contain an additive other than the above-described fluorosulfonylimide salt (1), an organic solvent and an optional other electrolyte salt in order to improve various properties such as an ionic conduction property, a thermal stability, a photostability, a viscosity property and a treatability. Such an additive is exemplified by an antioxidant, a deterioration inhibitor, a light stabilizer, a lubricant, a reinforcing agent and a filler.

The content amount of an additive in 100 mass % of the conductive material according to the present invention, which 100 mass % means the total of the fluorosulfonylimide salt (1), an organic solvent, an optional other electrolyte and an additive, is preferably 0.01 mass % or more and 50 mass % or less. The content amount is more preferably 0.1 mass % or more, even more preferably 0.5 mass % or more, and more preferably 20 mass % or less, even more preferably 10 mass % or less. When the content amount of an additive is excessively large, an intrinsic property of the conductive material may be possibly deteriorated; on the one hand, when the content amount of an additive is too small, a desired effect may be possibly exerted.

1-4. Turbidity

The turbidity of the conductive material according to the present invention is 50 NTU/mol-LiFSI or less. The turbidity is an index of a turbidness degree of a conductive material. A small turbidity value means that a conductive material is clear. In the present invention, the turbidity is measured by a light scattering measurement method, i.e. nephelometry measurement method, in accordance with ISO7027. More specifically, the turbidity of a sample solution is defined as a turbidity measured by performing calibration of a turbidity meter such as Turbidimeter "2100P" manufactured by HACK with a Formazine standard solution, measuring a turbidity of the sample solution, and converting the measured value to a value of a solution having a concentration of 1 mol/L, in accordance with ISO7027. Even when the conductive material contains a compound such as the fluorosulfonylimide salt (1) other than LiFSI, the electrolyte salt (2), the electrolyte (3) or lithium hexafluorophosphate, the turbidity of a solution having a LiFSI concentration of 1 mol/L can be obtained as described above. It is preferred that the turbidity is measured within 2 hours from the preparation of a sample solution.

The turbidity of the conductive material according to the present invention is preferably 40 NTU/mol-LiFSI or less, more preferably 30 NTU/mol-LiFSI or less, and even more preferably 25 NTU/mol-LiFSI or less. When the conductive material having excessively high turbidity is used as a nonaqueous electrolyte or an antistatic agent, a clogging of a separator or an outside appearance fault of a molded product may possibly be caused. It is preferred that the turbidity is low as much as possible. In general, however, an excessive purification is needed for too much lower turbidity. Such an excessive purification may possibly make the production process cumbersome and is not economically preferable.

The ion conductivity of the conductive material at 25° C. is preferably $1 \times 10^{-6}$ S/cm or more, more preferably $1 \times 10^{-5}$ S/cm or more, and even more preferably $1 \times 10^{-4}$ S/cm or more. When the conductive material having the ion conductivity included in the above-described range is used as a nonaqueous electrolyte and an antistatic agent as described later, a desired property may be easily obtained.

The ion conductivity can be measured by a complex impedance method with using an impedance analyzer equipped with SUS electrode, such as HP4294A manufactured by TOYO Corporation and SI1260 manufactured by Solartron.

The viscosity of the conductive material at 25° C. is preferably 500 mPa·s or less, more preferably 100 mPa·s or less, and even more preferably 50 mPa·s or less. The lower limit of the viscosity of the conductive material is not particularly restricted, and the viscosity is preferably 1 mPa·s or more. When the viscosity of the conductive material is included in the above-described range, a filtration property is preferably improved. For example, the viscosity can be measured by Rheometer (DV-III type, cone: CPE) manufactured by Brookfield.

2. Production Method and Purification Method of Conductive Material

Hereinafter, the production method and purification method of the conductive material according to the present invention are described. The production method and purification method according to the present invention are characterized in filtering a solution containing the fluorosulfonylimide salt (1) using a filter medium, i.e. filter, comprising at least one material selected from the group consisting of a cellulose resin, a polyester resin, a silicon dioxide material and activated carbon. The solution is the above-described conductive material and hereinafter is referred to as "fluorosulfonylimide salt (1) solution" in some cases.

The inventor made a great deal of a study to obtain a clear solution of the fluorosulfonylimide salt (1) having a low turbidity; and as a result, found that the fluorosulfonylimide salt (1) solution becomes cloudy due to a suspended substance in the solution and such a suspended substance can hardly be removed even by using a filter medium having a small pore. In addition, the inventor further made a study to complete the present invention by finding that the turbidity of the fluorosulfonylimide salt (1) solution can be effectively reduced by filtering the solution with a filter medium composed of the specific material.

The timing of the filtration in the present invention is not particularly restricted. For example, a solution of the fluorosulfonylimide salt (1), i.e. the conductive material composition, may be prepared by mixing the preliminarily synthesized fluorosulfonylimide salt (1), an organic solvent and an optional other component, and may be directly filtered in a continuous manner. Alternatively, a solution of the fluorosulfonylimide salt (1) is once produced and may be filtered before use as a nonaqueous electrolyte or an antistatic agent described later. In the present invention, the above former method is referred to as a method for producing a conductive material, and the latter method is referred to as a method for purifying a conductive material.

One of the production method and purification method of the present invention may be performed alone. Alternatively, after the conductive material is produced by the production method of the present invention, and the obtained conductive material may be further subjected to the purification method of the present invention.

In the present invention, a filter medium, i.e. filter, comprising at least one material selected from the group consisting of a cellulose resin, a polyester resin, a silicon dioxide material and activated carbon is used.

Since water is an impurity for a nonaqueous electrolyte, the above-described filter medium, which may adsorb water, is generally not used but a mesh composed of stainless steel or the like is mainly used. On the one hand, in the present invention, a filter medium, i.e. filter, comprising at least one polar material selected from the group consisting of a cellulose resin, a polyester resin, a silicon dioxide material and activated carbon is used, since the turbidity of the conductive material can be remarkably improved after the filtration. The reason why the turbidity of the conductive material is improved by using the above filter medium is considered to be that a polar filter medium adsorbs a suspended substance which causes turbidness.

A cellulose resin is exemplified by cellulose acetate, absorbent cotton, and paper and cloth of which raw material is cellulose. A polyester resin is exemplified by polyethylene terephthalate and polybutylene terephthalate. A silicon dioxide material is exemplified by a glass material (such as a silicate material), silica, diatomite and clay plate. Activated carbon is exemplified by gas activated carbon and zinc chloride activated carbon.

The form of the above-described material is not particularly restricted, and exemplified by fibrous form, powdery form, granular from, block form, pillared form, rolled form, spindle form and film form. The thickness of the film is not particularly restricted, and a sheet and a foil are included in the range of the film. The same applies hereafter. It is preferred in the present invention to use a filter medium comprising at least one material selected from the group consisting of a cellulose fiber, polyester fiber, glass fiber, silica fiber, granular activated carbon, powdery activated carbon, fibrous activated carbon, granular silica, powdery silica, granular diatomite and powdery diatomite.

The form and configuration of the filter medium according to the present invention is not particularly restricted as long as the filter medium contains at least one of the above-described material. For example, any one of woven fabric, non-woven fabric, a film and plate composed of the above-described material, a product prepared by packing any packages with the above-described material, and a product prepared by preliminarily molding the above-described material or filter medium into any forms and packing any packages with the molded material or filter medium can be used in the present invention. More specifically, a flat filter paper, a cylindrical filter paper, a cartridge filter, a capsule filter, a membrane filter, a hollow fiber membrane filter, a pleated membrane filter, woven fabric, non-woven fabric and a filter plate are exemplified.

The retained particle diameter of the filter medium usable in the production method of the present invention is preferably 0.05 µm or more and 200 µm or less, more preferably 0.05 µm or more and 5 µm or less, and even more preferably 0.05 µm or more and 1 µm or less. When the retained particle diameter of the filter medium is included in the above-described range, a fine impurity may be also removed by filtration. When the retained particle diameter is excessively small, the filter medium may tend to be easily clogged. On the one hand, when the retained particle diameter is excessively large, it may tend to be difficult to remove a fine impurity. When a highly concentrated solution is filtered, the retained particle diameter of the filter medium is preferably 1 µm or more, more preferably 3 µm or more, even more preferably 5 µm or more, and particularly preferably 7 µm or more.

The retained particle diameter means the following particle diameter. Barium sulfate specified in JIS P 3801 is naturally filtered, and then a filtration efficiency is calculated from the numbers of particles in the liquid before filtration and the filtrate. When about 99% or more of particles having a certain diameter is separated, the particle diameter corresponds to the retained particle diameter. As the retained particle diameter, the nominal value by the manufacturer may be used or the measured value by the above-described method may be used.

The specific filter medium usable in the present invention is exemplified by "1034-2", "No. 1" to "No. 7" and "NA-17" containing cellulose fiber and diatomite, manufactured by ADVANTEC, a filter paper for Kiriyama-rohto (registered trademark) No. 3, No. 4, No. 5A, No. 5B, No. 5C, No. 6 and No. 7 manufactured by Kiriyama glass Co., as a filter medium containing cellulose; "TRG940B2K" manufactured by Nakao Filter Media Corp., as a filter medium containing polyester; "SS-47" manufactured by Kiriyama glass Co., and "GA-55", "GA-100", "GC-50", "GC-55", "GF-75" and "GS-25" manufactured by ADVANTEC, as a filter medium containing glass fiber; "QR-100" and "QR-200" manufactured by ADVANTEC, as a filter medium containing silica fiber; and "CP-20" manufactured by ADVANTEC, as a filter medium containing activated carbon.

In the present invention, one of the filter medium may be used alone, or two or more filter media may be used in combination. Accordingly, in the present invention range, an embodiment in which one or a plurality of filter media containing one kind of the material are used, such as use of two or more glass fiber filter papers, and use of a glass fiber filter paper and a cellulose fiber filter paper in combination; an embodiment in which one or a plurality of filter media containing two or more kinds of the materials are used, such as use of a filter plate composed of a cellulose fiber and diatomite; and the embodiment of the combination thereof are included.

The method with respect to the solution containing the fluorosulfonylimide salt (1) is not particularly restricted, and a conventionally-known method may be employed. For example, a filtration method is exemplified by natural filtration, suction filtration, pressure filtration and centrifugal filtration. Suction filtration is preferred, since sufficiently low turbidity can be achieved in a shorter time than natural filtration.

3. Nonaqueous Electrolyte

The above-described conductive material can be used as a nonaqueous electrolyte for a power storage device such as a double layer capacitor, a lithium ion capacitor and a lithium ion secondary battery. Since the turbidity of the conductive material according to the present invention is 50 NTU/mol-LiFSI or less, the nonaqueous electrolyte containing the conductive material hardly causes a failure, such as clogging of a separator and degradation of performance due to a maldistribution of a suspended component in the nonaqueous electrolyte during long-term use.

The nonaqueous electrolyte of the present invention contains the above-described conductive material. In other words, the composition of the nonaqueous electrolyte according to the present invention is not particularly restricted as long as the nonaqueous electrolyte contains the above-described conductive material. Specifically, in the present invention, the above-described conductive material may be used as a nonaqueous electrolyte as it is, and if necessary, a nonaqueous electrolyte may contain a component, such as an organic solvent and various additives used for a nonaqueous electrolyte of a conventional power storage device, in addition to the conductive material.

3-1. Organic Solvent for Nonaqueous Electrolyte

An organic solvent usable for the nonaqueous electrolyte of the present invention is exemplified by an ether solvent, a sulfur compound solvent and other solvents in addition to the above-described carbonate solvent, ester solvent, ketone solvent and alcohol solvent. In addition, the nonaqueous electrolyte of the present invention may contain a medium, such as polymer and polymer gel, which is used in various power storage device in place of a solvent.

An ether organic solvent is exemplified by ethylene glycol dimethyl ether, ethylene glycol diethyl ether, tetrahydrofuran, 2-methyltetrahydrofuran, 2,6-dimethyltetrahydrofuran, tetrahydropyran, crown ether, triethylene glycol dimethyl ether, tetraethylene glycol dimethyl ether, 1,4-dioxane and 1,3-dioxolan. A sulfur compound organic solvent is exemplified by dimethyl sulfone, ethyl methyl sulfone, diethyl sulfone, sulfolane, 3-methylsulfolane and 2,4-dimethylsulfolane. In addition, nitromethane, 1,3-dimethyl-2-imidazolidinone, 1,3-dimethyl-3,4,5,6-tetrahydro-2(1H)-pyrimidinone and 3-methyl-2-oxazolidinone are exemplified.

Among the above examples, a carbonate ester solvent such as a chain carbonate ester solvent and a cyclic carbonate solvent, a lactone solvent and an ether solvent are preferred, dimethyl carbonate, ethyl methyl carbonate, diethyl carbonate, ethylene carbonate, propylene carbonate, γ-butyrolactone and γ-valerolactone are more preferred, and dimethyl carbonate, ethyl methyl carbonate, diethyl carbonate, ethylene carbonate and propylene carbonate are even more preferred. One kind of the above-described nonaqueous solvent may be used alone, or two or more kinds of the above-described nonaqueous solvents may be used in combination.

When a polymer or polymer gel is used in place of an organic solvent, the following methods may be employed. Specifically, a method to produce a gel electrolyte in which a polymer is formed into a film by a conventionally-known method, the conductive material is dissolved in the above-described organic solvent to obtain a solution, the solution is added dropwise on the film to impregnate the conductive material and the organic solvent to be supported on the film; a method to produce a gel electrolyte in which a polymer is melted at a temperature higher than the melting point of the polymer to be mixed with the conductive material, the melted mixture is formed into a film, and the film is impregnated with a nonaqueous solvent; a method in which the conductive material and other component are preliminarily dissolved in an organic solvent to obtain the nonaqueous electrolyte, the nonaqueous electrolyte is mixed with a polymer, the mixture is formed into a film by a cast method or a coating method, and the organic solvent is vaporized, are exemplified.

The polymer usable in place of an organic solvent is exemplified by a polyether polymer such as polyethylene oxide, i.e. PEO, and polypropylene oxide, which are a homopolymer or a copolymer of an epoxy compound such as ethylene oxide, propylene oxide, butylene oxide and allyl glycidyl ether; a methacryl polymer such as polymethyl methacrylate, i.e. PMMA; a nitrile polymer such as polyacrylonitrile (PAN); a fluorinated polymer such as polyvinylidene fluoride (PVdF) and polyvinylidene fluoride-hexafluoropropylene; and a copolymer thereof.

3-2. Additive for Nonaqueous Electrolyte

The nonaqueous electrolyte of the present invention may contain an additive to improve various properties of a power storage device.

An additive is exemplified by a cyclic carbonate having a unsaturated bond, such as vinylene carbonate (VC), vinylethylene carbonate (VEC), methylvinylene carbonate (MVC) and ethylvinylene carbonate (EVC); a carbonate compound such as fluoroethylene carbonate, trifluoropropylene carbonate, phenylethylene carbonate and erythritan carbonate; a carboxylic acid anhydride such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride and phenylsuccinic anhydride; a sulfur-containing compound such as ethylene sulfite, 1,3-propanesultone, 1,4-butanesultone, methyl methanesulfonate, busulfan, sulfolane, sulfolene, dimethyl sulfone, tetramethylthiuram monosulfide and trimethylene glycol sulfate ester; a nitrogen-containing compound such as 1-methyl-2-pyrrolidinone, 1-methyl-2-piperidone, 3-methyl-2-oxazolidinone, 1,3-dimethyl-2-imidazolidinone and N-methylsuccinimide; a phosphate such as monofluorophosphate and difluorophosphate; a saturated hydrocarbon compound such as heptane, octane and cycloheptane.

The concentration of the above-described additive in the nonaqueous electrolyte of the present invention is preferably 0.1 mass % or more and 10 mass % or less, more preferably 0.2 mass % or more and 8 mass % or less, and even more preferably 0.3 mass % or more and 5 mass % or less, on the basis that the total of the conductive material, an optional organic solvent and additive is 100 mass %. When the usage amount of the additive is too small, it may be possibly difficult to obtain an effect by the additive in some cases. On the one hand, even when a large amount of the additive is used, an effect commensurate with added amount may be hardly obtained and a conductivity may be possibly decreased due to high viscosity of the nonaqueous electrolyte.

For example, the nonaqueous electrolyte of the present invention can be preferably used as a nonaqueous electrolyte of a double layer capacitor, a lithium ion capacitor and a lithium ion secondary battery.

4. Antistatic Agent

The conductive material of the present invention also functions as an antistatic agent which gives an antistatic performance to a polymer Material. Since the turbidity of the conductive material according to the present invention is 50 NTU/mol-LiFSI or less, for example, when the conductive material is mixed and kneaded with a polymer material and the mixture is formed into a molded product, a desired color can be directly represented in the molded product. In addition, when an antistatic layer is formed on a molded product by using an application liquid containing the antistatic agent of the present invention, a design of the surface to be applied may be hardly changed and an outside appearance defect of the molded product can be suppressed.

The antistatic agent of the present invention contains the above-described conductive material. In other words, the antistatic agent of the present invention is not particularly restricted as long as the antistatic agent contains the above-described conductive material. Specifically, in the present invention, the above-described conductive material may be used as an antistatic agent as it is, and if necessary, the antistatic agent may contain a component which is used for a conventional antistatic agent, such as an additive used for improving various properties such as an electric conductivity, a thermal stability and a wettability, in addition to the conductive material.

4-1. Additive for Antistatic Agent

An additive usable for the antistatic agent of the present invention is exemplified by a dye, a colorant, a filler, a silane coupling agent, a bonding improver, a stabilizer, a leveling agent, an antifoam agent, a precipitation inhibitor, a lubricant and an antirust.

The concentration of an additive in the antistatic agent of the present invention is preferably 0.01 mass % or more and 50 mass % or less, more preferably 0.1 mass % or more and 20 mass % or less, and even more preferably 0.5 mass % or more and 10 mass % or less, on the basis that the total of the conductive material and the optional additive is 100 mass %. When the usage amount of the additive is too small, it may possibly be difficult to obtain an effect by the additive in some cases. On the one hand, even when a large amount of the additive is used, an effect commensurate with added amount may be hardly obtained.

4-2. Antistatic Agent-Containing Composition and Molded Product Having Antistatic Performance An antistatic agent-containing composition can be produced by mixing the above-described antistatic agent with a polymer material, a solvent and the like.

The polymer material is exemplified by a thermoplastic resin, a thermosetting resin and a rubber. A thermoplastic resin is exemplified by a polyolefin resin such as polyethylene, polypropylene and polystyrene, and a composition thereof; a polyacetal, an acrylate resin such as polyacrylate, and a composition thereof; a polyphenylene ether resin such as polyphenylene ether (PPE), PPE/polystyrene, PPE/polyamide (PA) and PPE/polybutylene terephthalate (PBT), and a composition thereof; a polyester resin such as polyetherketone, polyethylene terephthalate (PET) and PBT/ABS, and a composition thereof; a polycarbonate resin such as polycarbonate (PC), PC/ABS, PC/PET and PC/PBT, and a composition thereof; polyurethane and a composition thereof; polyvinyl chloride and polyvinylidene chloride; polyimide, polyetherimide and polyamideimide; a polyphenylenesulfide resin and a composition thereof; polysulfone. It is preferred that one or a plurality of the examples are used. Among the examples, an acrylate resin, a polyester resin, a polyamide resin, a polyurethane resin, a polyvinyl chloride resin and an epoxy resin are preferred, and it is preferred that at least one of the resins is used as the above-described polymer material, in terms of an excellent conductivity.

The above-described thermosetting resin is exemplified by a phenol resin, a urea resin, a melamine resin, an alkyd resin, a unsaturated polyester resin, an epoxy resin, a silicon resin and a polyurethane resin, and it is preferred that one or a plurality of the resins are used.

The above-described rubber is exemplified by polyurethane rubber, acrylic rubber, acrylonitrile-butadiene rubber, epichlorohydrin rubber, epichlorohydrin-ethylene oxide copolymer rubber, silicon rubber, fluoroolefin-vinyl ether copolymer polyurethane rubber, styrene-butadiene copolymer rubber and a foam thereof, and it is preferred that one or a plurality of the rubbers are used.

The usage amount of the antistatic agent may be appropriately adjusted depending on a use application, and may be preferably adjusted to 0.1 parts by mass or more and 50 parts by mass or less to 100 parts by mass of the polymer material. The amount is more preferably 1 part by mass or more, even more preferably 5 parts by mass or more, and more preferably 20 parts by mass or less, even more preferably 10 parts by mass or less. When the usage amount of the antistatic agent is too large, the antistatic agent may possibly bleed. On the one hand, when the usage amount of the antistatic agent is too small, a desired antistatic performance may not be possibly obtained.

For example, the antistatic agent of the present invention can be preferably used for a conductive sheet; a PCT (Pressure Cooker Test) element; a charging member, a cleaning member, a development member, a copy member of an electrophotographic printer, a copy machine or the like; a housing product such as a polymer thermosensitive element, home electronics, an office automation equipment, a game instrument and an office equipment; various plastic vessels such as an IC (Integrated Circuit) tray; various molded products such as a film for package, a floor cover sheet, an artificial turf, a mat and automotive parts; a resin material having an antistatic performance.

The present application claims the benefit of the priority date of Japanese patent application No. 2015-125926 filed on Jun. 23, 2015. All of the contents of the Japanese patent application No. 2015-125926 filed on Jun. 23, 2015, are incorporated by reference herein.

EXAMPLES

Hereinafter, the present invention is described in more detail with Examples. The present invention is, however, not restricted to the following Examples in any way, and it is possible to work the present invention according to the Examples with an additional appropriate change within the range of the above descriptions and the following descriptions. Such a changed embodiment is also included in the technical scope of the present invention. The following "part" is "part by mass" and "%" is "mass %" unless otherwise noted.

Measurement of Turbidity

A turbidity was measured by a light scattering measurement method, i.e. nephelometry measurement method, in accordance with ISO7027 in the present invention. More specifically, a turbidity measurement device ("2100P" manufactured by HACK) was subjected to calibration by using a Formazine standard solution in accordance with ISO7027. Then, the lithium bis(fluorosulfonyl)imide solution of which concentration of the fluorosulfonylimide salt (1) was 1 mol/L before filtration and the conductive material of which concentration of the fluorosulfonylimide salt (1) was 1 mol/L after filtration prepared by Examples and Comparative examples described later were subjected to a measurement by light scattering measurement method, i.e. nephelometry measurement method, at 25° C., and the turbidity was obtained from the measured value and a preliminarily prepared calibration curve.

Example 1

A lithium bis(fluorosulfonyl)imide solution was prepared by dissolving lithium bis(fluorosulfonyl)imide (manufactured by NIPPON SHOKUBAI CO., LTD., hereinafter, referred to as "LiFSI") in diethyl carbonate (DEC) (manufactured by KISHIDA CHEMICAL Co., Ltd., LBG grade) in a concentration of 1 mol/L. The turbidity of the lithium bis(fluorosulfonyl)imide solution was measured; as a result, the turbidity was 80 NTU/mol-LiFSI.

Then, a cellulose fiber filter paper ("1034-2" manufactured by ADVANTEC, retained particle diameter: 1 μm) was located as a filter medium on the perforated plate of a filter holder for suction filtration ("KGS-47" manufactured by ADVANTEC, effective filtration area: 9.6 $cm^2$). The filter holder was installed in a bell jar, and the pressure was reduced using a vacuum pump. The filter medium was moisturized using a part of 100 mL of the lithium bis(fluorosulfonyl)imide solution, and then the remaining lithium bis(fluorosulfonyl)imide solution was poured to be filtered under reduced pressure to obtain conductive material No. 1. The filtration time was 10 seconds. The turbidity of the conductive material No. 1 was measured in accordance with the above-described measurement method. The result is shown in Table 1.

Example 2

Conductive material No. 2 was prepared similarly to Example 1 except that a glass fiber filter paper ("SS-47" manufactured by Kiriyama glass Co., retained particle diameter: 0.5 μm) was used as a filter medium, and the turbidity was measured. The result is shown in Table 1.

Example 3

Conductive material No. 3 was prepared similarly to Example 1 except that a vacuum pump was not used, in other words, natural filtration was performed, and the turbidity was measured. The filtration time was 60 seconds. The result is shown in Table 1.

Example 4

Conductive material No. 4 was prepared similarly to Example 1 except that a filter paper composed of polyester fiber ("TRG940B2K" manufactured by Nakao Filter Media Corp.) was used as a filter medium, and the turbidity was measured. The filtration time was 30 seconds. The result is shown in Table 1.

Example 5

Conductive material No. 5 was prepared similarly to Example 1 except that a filter plate composed of cellulose fiber ("1034-2" manufactured by ADVANTEC) was used as a filter medium, and the turbidity was measured. The filtration time was 8 seconds. The result is shown in Table 1.

Example 6

Conductive material No. 6 was prepared similarly to Example 1 except that a filter paper composed of cellulose fiber and diatomite ("NA-17" manufactured by ADVANTEC, retained particle diameter: 0.3 μm) was used as a filter medium, and the turbidity was measured. The filtration time was 25 seconds. The result is shown in Table 1.

Comparative Example 1

Conductive material No. 7 was prepared similarly to Example 1 except that a commercially available stainless steel mesh (800 mesh, aperture: 16 μm, converted retained particle diameter: 16 μm) was used, and the turbidity was measured. The filtration time was 5 seconds. The result is shown in Table 1.

Comparative Example 2

Conductive material No. 8 was prepared similarly to Example 1 except that a hydrophilic PTFE filter paper ("H010A047" manufactured by ADVANTEC, subjected to hydrophilic treatment, pore size: 0.1 μm, converted retained particle diameter: 0.1 μm) was used as a filter medium, and the turbidity was measured. The filtration time was 8 seconds. The result is shown in Table 1.

Comparative Example 3

The inventor tried to filter the lithium bis(fluorosulfonyl)imide solution under reduced pressure similarly to Example 1 except that a hydrophobic PTFE filter paper ("T010A047" manufactured by ADVANTEC, pore size: 0.1 μm, converted retained particle diameter: 0.1 μm) was used as a filter medium; however, the filtration could not be performed, since the lithium bis(fluorosulfonyl)imide solution was repelled from the filter medium.

TABLE 1

| | | Conductive material No. | Filter medium Kind | Retained particle diameter | Filtration condition Filtration method | Time (seconds) | Turbidity after filtration (NTU/mol-LiFSI) |
|---|---|---|---|---|---|---|---|
| Reference | | | LiFSI solution (1M) before filtration | — | — | — | 80 |
| Example | 1 | 1 | Cellulose fiber filter paper | 1 μm | Suction filtration | 10 | 20 |
| | 2 | 2 | Glass fiber filter paper | 0.5 μm | Suction filtration | 10 | 20 |
| | 3 | 3 | Cellulose fiber filter paper | 0.5 μm | Natural filtration | 60 | 11 |
| | 4 | 4 | Polyester fiber filter paper | 0.5 μm | Suction filtration | 30 | 8 |
| | 5 | 5 | Cellulose fiber filter plate | | Suction filtration | 8 | 16 |
| | 6 | 6 | Cellulose fiber · diatomite filter paper | 0.3 μm | Suction filtration | 25 | 5 |
| Comparative example | 1 | 7 | Stainless steel mesh | 16 μm | Suction filtration | 5 | 80 |
| | 2 | 8 | Hydrophilic PTFE filter paper | 0.1 μm | Suction filtration | 8 | 75 |
| | 3 | 9 | Hydrophobic PTFE filter paper | 0.1 μm | Suction filtration | — | — |

It is found from Table 1 that all the turbidities of the fluorosulfonylimide (1) solutions filtrated by using the filter medium containing the specific material were lower than 50 NTU/mol-LiFSI in Examples and the solutions were clear, while the turbidities of the fluorosulfonylimide (1) solutions could not be reduced though the pore size was 0.1 μm and retained particle diameter was 0.1 μm in Comparative examples. In addition, it is found from the results of Examples 2 and 4 and Comparative examples 1 to 3 that not only a retained particle diameter of a filter medium but also a constituent material of a filter medium influence an effect of reducing the turbidity of a fluorosulfonylimide (1) solution.

Example 7

LiFSI was dissolved in diethyl carbonate (DEC) to prepare LiFSI solution having a concentration of 3.3 mol/L. The turbidity of the LiFSI solution was measured; as a result, the turbidity was 65 NTU/mol-LiFSI.

Then, a filter paper (manufactured by Kiriyama glass Co., filter paper for Kiriyama-rohto (registered trademark) No. 5A, retained particle diameter: 7 μm) was located as a filter medium on a holder for pressure filtration ("KST-47" manufactured by ADVANTEC, effective filtration area: 12.5 cm²). The above-described LiFSI solution was subjected to pressure filtration under a pressure of 0.5 MPa to obtain conductive material No. 10. The filtration time was 134 seconds. The turbidity of the conductive material No. 10 was measured in accordance with the above-described measurement method. The result is shown in Table 2.

Example 8

Conductive material No. 11 was prepared similarly to Example 7 except that the filter paper was changed to a filter paper for Kiriyama-rohto (registered trademark) No. 3 (manufactured by Kiriyama glass Co., retained particle diameter: 5 μm), and the turbidity was measured. The result is shown in Table 2.

Example 9

Conductive material No. 12 was prepared similarly to Example 8 except that the concentration of DEC solution of LiFSI was changed to 2.2 mol/L, and the turbidity was measured. The result is shown in Table 2.

Example 10

Conductive material No. 13 was prepared similarly to Example 7 except that the solvent was changed from diethyl carbonate (DEC) to ethylene carbonate (EC), and the turbidity was measured. The result is shown in Table 2.

Example 11

Conductive material No. 14 was prepared similarly to Example 9 except that the solvent was changed from diethyl carbonate (DEC) to ethylene carbonate (EC), and the turbidity was measured. The result is shown in Table 2.

tion is used for various power storage devices, it can be expected that a failure is hardly caused. In addition, it can be expected that the antistatic agent which contains the conductive material of the present invention hardly causes an outside appearance defect in a molded product.

The invention claimed is:
1. A method for producing a conductive material, wherein the conductive material comprises a fluorosulfonylimide salt represented by
the following formula (1)

(1)

wherein X is F or a $C_1$-$C_6$ fluoroalkyl group, and at least one organic solvent selected from the group consisting of a carbonate solvent, an ester solvent, a ketone solvent and an alcohol solvent, and
wherein the conductive material has an ion conductivity, comprising the step of filtering a solution comprising the fluorosulfonylimide salt by using a filter medium comprising at least one material selected from the group consisting of a cellulose resin, a polyester resin, a silicon dioxide material and activated carbon,
wherein the conductive material is characterized in that it is filtered using a filter medium having a retained particle diameter of 0.05 μm or more or 200 μm or

TABLE 2

| | Conductive material No. | Solution concentration mol/L | Filter medium Kind | Retained particle diameter | Filtration condition Filtration method | Time (seconds) | Turbidity after filtration (NTU/mol-LiFSI) |
|---|---|---|---|---|---|---|---|
| Reference | LiFSI solution before filtration (3.3 mol/DEC) | 3.3 | — | — | — | — | 66 |
| Example 7 | 10 | 3.3 | Filter paper for Kiriyama-rohto No. 5A | 7 μm | Pressure filtration at 0.5 MPa | 134 | 15 |
| Example 8 | 11 | 3.3 | Filter paper for Kiriyama-rohto No. 3 | 5 μm | Pressure filtration at 0.5 MPa | 642 | 13 |
| Reference | LiFSI solution before filtration (2.2 mol/DEC) | 2.2 | — | — | — | — | 59 |
| Example 9 | 12 | 2.2 | Filter paper for Kiriyama-rohto No. 3 | 5 μm | Pressure filtration at 0.5 MPa | 60 | 13 |
| Reference | LiFSI solution before filtration (3.3 mol/DEC) | 3.3 | — | — | — | — | 61 |
| Example 10 | 13 | 3.3 | Filter paper for Kiriyama-rohto No. 5A | 7 μm | Pressure filtration at 0.5 MPa | 267 | 12 |
| Reference | LiFSI solution before filtration (2.2 mol/DEC) | 2.2 | — | — | — | — | 60 |
| Example 11 | 14 | 2.2 | Filter paper for Kiriyama-rohto No. 3 | 5 μm | Pressure filtration at 0.5 MPa | 75 | 13 |

It is found from the above result that a clear conductive material having low turbidity can be provided by the present invention. Accordingly, when the nonaqueous electrolyte which contains the conductive material of the present invention less and, after filtration, the turbidity is 50 NFU/mol-LiFSI or less when measured at 25° C. by a scattering light measuring method using a formazan standard solution.

2. A method for purifying a conductive material, wherein the conductive material comprises a fluorosulfonylimide salt represented by
the following formula (1)

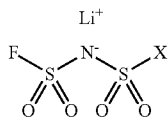

(1)

wherein X is F or a $C_1$-$C_6$ fluoroalkyl group, and at least one organic solvent selected from the group consisting of a carbonate solvent, an ester solvent, a ketone solvent and an alcohol solvent, and
wherein the conductive material has an ion conductivity, comprising the step of filtering a solution comprising the fluorosulfonylimide salt by using a filter medium comprising at least one material selected from the group consisting of a cellulose resin, a polyester resin, a silicon dioxide material and activated carbon,
wherein the conductive material is characterized in that it is filtered using a filter medium having a retained particle diameter of 0.05 μm or more or 200 μm or less and, after filtration, the turbidity is 50 NTU/mol-LiFSI or less when measured at 25° C. by a scattering light measuring method using a formazin standard solution.

3. The method according to claim 1, wherein the conductive material is a nonaqueous electrolyte solution.

4. The method according to claim 2, wherein the conductive material is a nonaqueous electrolyte solution.

5. The method according to claim 1, wherein the ion conductivity of the conductive material at 25° C. is $1 \times 10^{-6}$ S/cm or more.

6. The method according to claim 2, wherein the ion conductivity of the conductive material at 25° C. is $1 \times 10^{-6}$ S/cm or more.

7. The method according to claim 2, wherein a concentration of the fluorosulfonylimide salt in the conductive material is 0.1 mol/L or more.

8. The method according to claim 2, wherein a concentration of the fluorosulfonylimide salt in the conductive material is 0.1 mol/L or more.

9. The method according to claim 1, wherein the X is F.

10. The method according to claim 2, wherein the X is F.

11. A conductive material comprising:
a fluorosulfonylimide salt represented by the following formula (1):

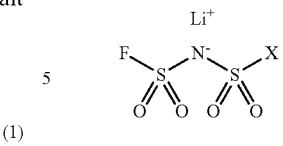

(1)

wherein X is F or a $C_{1-6}$ fluoroalkyl group,
and at least one organic solvent selected from the group consisting of a carbonate solvent, an ester solvent, a ketone solvent and an alcohol solvent,
wherein the conductive material has an ion conductivity, and
wherein the conductive material is obtained by the method according to claim 1.

12. A conductive material comprising:
a fluorosulfonylimide salt represented by the following formula (1):

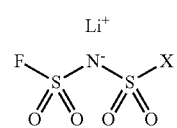

(1)

wherein X is F or a $C_{1-6}$ fluoroalkyl group,
and at least one organic solvent selected from the group consisting of a carbonate solvent, an ester solvent, a ketone solvent and an alcohol solvent,
wherein the conductive material has an ion conductivity, and
wherein the conductive material is obtained by the method according to claim 2.

13. The method according to claim 1, wherein the filter medium comprises at least one material selected from the group consisting of a cellulose resin, a polyester resin and activated carbon.

14. The method according to claim 2, wherein the filter medium comprises at least one material selected from the group consisting of a cellulose resin, a polyester resin and activated carbon.

15. The conductive material according to claim 11, wherein the filter medium comprises at least one material selected from the group consisting of a cellulose resin, a polyester resin and activated carbon.

16. The conductive material according to claim 12, wherein the filter medium comprises at least one material selected from the group consisting of a cellulose resin, a polyester resin and activated carbon.

* * * * *